United States Patent
Tang

(10) Patent No.: US 10,856,180 B2
(45) Date of Patent: Dec. 1, 2020

(54) RECONFIGURATION METHOD AND RELATED PRODUCTS

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 8 days.

(21) Appl. No.: 16/353,567

(22) Filed: Mar. 14, 2019

(65) Prior Publication Data

US 2019/0215721 A1    Jul. 11, 2019

Related U.S. Application Data

(63) Continuation of application No. PCT/CN2017/094775, filed on Jul. 27, 2017.

(51) Int. Cl.
| | | |
|---|---|---|
| *H04W 28/06* | (2009.01) | |
| *H04W 24/04* | (2009.01) | |
| *H04W 36/00* | (2009.01) | |
| *H04W 76/19* | (2018.01) | |

(52) U.S. Cl.
CPC .......... *H04W 28/06* (2013.01); *H04W 24/04* (2013.01); *H04W 36/00* (2013.01); *H04W 36/0069* (2018.08); *H04W 36/0027* (2013.01); *H04W 76/19* (2018.02)

(58) Field of Classification Search
None
See application file for complete search history.

(56) References Cited

U.S. PATENT DOCUMENTS

| | | | | |
|---|---|---|---|---|
| 2009/0257399 | A1* | 10/2009 | Kuo | H04W 12/001 370/331 |
| 2010/0215020 | A1* | 8/2010 | Lee | H04L 1/1841 370/331 |
| 2015/0304378 | A1* | 10/2015 | Bi | H04L 65/4076 370/329 |
| 2016/0044639 | A1 | 2/2016 | Yi et al. | |

(Continued)

FOREIGN PATENT DOCUMENTS

| | | |
|---|---|---|
| CN | 101810031 A | 8/2010 |
| CN | 103517356 A | 1/2014 |

(Continued)

OTHER PUBLICATIONS

The Notice of Allowance of corresponding Chinese application No. 201780053572.8, dated Feb. 7, 2020.

(Continued)

*Primary Examiner* — Rebecca E Song

(57) ABSTRACT

Embodiments of the present disclosure provide a reconfiguration method and related products, where the method includes: receiving, by a user equipment, a reconfiguration instruction from a network device, wherein the reconfiguration instruction is used to instruct reconfiguration of a PDCP layer; reconfiguring the PDCP layer and transmitting an EM) by the user equipment. Embodiments of the present disclosure can prevent other bearers from being affected by a change in the PDCP layer, thereby ensuring data continuity of other services.

20 Claims, 9 Drawing Sheets

(56) References Cited

U.S. PATENT DOCUMENTS

| | | | | |
|---|---|---|---|---|
| 2019/0098544 | A1* | 3/2019 | Han | H04W 36/0044 |
| 2019/0174377 | A1* | 6/2019 | Decarreau | H04W 36/08 |
| 2019/0268818 | A1* | 8/2019 | Yi | H04W 36/0033 |
| 2020/0107189 | A1* | 4/2020 | Sharma | H04L 63/0435 |

FOREIGN PATENT DOCUMENTS

| | | |
|---|---|---|
| CN | 104684031 A | 6/2015 |
| CN | 105230077 A | 1/2016 |
| CN | 106304398 A | 1/2017 |
| CN | 106304399 A | 1/2017 |
| CN | 106537882 A | 3/2017 |
| GB | 2528913 A | 2/2016 |
| WO | 2014/166106 A1 | 10/2014 |
| WO | 2016140757 A1 | 9/2016 |

OTHER PUBLICATIONS

3GPP TSG-RAN2 Meeting #97 R2-1701864, Qualcomm Incorporated, Remaining Details of PDCP Key Change, published on Feb. 17, 2017.

3GPP TSG-RAN WG2 #98 R2-1704853, Huawei et al., SgNB to MgNB reconfiguration for 0ms interruption handover, published on May 19, 2017.

3GPP TSG RAN WG2 Meeting #98 R2-1704856, Huawei et al., L2 handling for 0ms interruption mobility, published on May 19, 2017.

Extended European Search Report dated Sep. 23, 2019 Appln. No. 17919467.5.

Intel Corporation el al:"Further details of PDCP key change mechanism using LWA End-Marker with last SN", R2-1701939 (3GPP); vol. RAN WG2, No. Athens, Greece; Feb. 13, 2017-Feb. 17, 2017; Feb. 12, 2017.

Huawei et al: "SgNB to MgNB reconfiguration for 0ms interruption handover", R2-1706709 (3GPP); vol. RAN WG2, No. Qingdao, China; Jun. 27, 2017-Jun. 29, 2017; Jun. 26, 2017.

Ericsson: "Remaining issues for PDCP key change for HO when configuration is", R2-1701621 (3GPP); vol. RAN WG2, No. Athens, Greece; Feb. 13, 2017-Feb. 17, 2017; Feb. 12, 2017.

The first examination report of parallel CN application dated Nov. 28, 2019.

Hauwei Hisilicon: "Support of NR Intra-cell handover", R2-1704846 (3GPP); vol. RAN WG2, No. Hangzhou, China; May 15, 2019-May 19, 2019; May 19, 2017.

Huawei Hisilicon: "Security key change without L2 reset", R2-1706713 (3GPP); vol. RAN WG2, No. Qingdao, China; Jun. 27, 2017-Jun. 29, 2017; Jun. 29, 2017.

Nokia; "Discussion on RAN2 LS and eLWA changes S3-170107", 3GPP TSG SA WG3 (Security) Meeting #86 Feb. 6-10, 2017, Sophia Antipolis France, 2 pages.

Ericsson, "Bearer type switching in dual connectivity Tdoc R2-1700909", 3GPP TSG-RAN WG2 #97, Athens, Greece, Feb. 13-17, 2017, 5 pages.

LG Electronics Inc. (PDCP Rapporteur); "38.323v0.1.0 NR PDCP specification" Cover R-1706868, 3GPP TSG-RAN WG2 NR AdHoc, Qingdao, China, Jun. 27-Jun. 29, 2017, 1 page.

R2-1706868 38323-010 clean; 3GPP TS 38.323 v0.1.0 (Jun. 2017) 3rd Generation Partnership Project; Technical Specification Group Radio Access Network; NR; Packet Data Convergence Protocol (PDCP) specification (Release 15), 25 pages.

R2-1706868 38323-010 rm; 3rd Generation Partnership Project; Technical Specification Group Radio Access Network; NR; Packet Data Convergence Protocol (PDCP) specification (Release 15), 24 pages.

* cited by examiner

| D/C | PDU Type | R | R | R | R | Oct 1 |

| FMC | Oct 2 |
| FMC (cont.) | Oct 3 |
| FMC (cont.) | Oct 4 |
| FMC (cont.) | Oct 5 |
| Bitmap1 (optional) | Oct 6 |
| ... | ⋮ |
| BitmapN (optional) | Oct 5+N |

RECONFIGURATION METHOD AND RELATED PRODUCTS

CROSS-REFERENCE TO RELATED APPLICATIONS

This application is a continuation of International Application No. PCT/CN2017/094775, filed on Jul. 27, 2017, entitled "RECONFIGURATION METHOD AND RELATED PRODUCTS", the content of which is incorporated herein by reference in its entirety.

TECHNICAL FIELD

The present disclosure relates to the field of communication technologies, and in particular, to a reconfiguration method and related products.

BACKGROUND

In the system architecture of Long Term Evolution (LTE) and Dual Connectivity (DC), a user Equipment (UE) can maintain connection with LTE and NR system simultaneously. In the protocol stack structures of the LTE and DC systems, for the Packet Data Convergence Protocol (PDCP) layer, both LTE PDCP and NR PDCP may be used at the LIE side. In order to achieve configurability of the LTE PDCP and the NR PDCP, the currently available solution is to reset all bearers based on the handover procedure.

SUMMARY

Embodiments of the present disclosure provide a reconfiguration method and related products, which can prevent other bearers from being affected by a change in the PDCP layer, thereby ensuring data continuity of other services.

In a first aspect, an embodiment of the present disclosure provide a reconfiguration method, including:

receiving, by a user equipment, a reconfiguration instruction from a network device, where the reconfiguration instruction is used to instruct reconfiguration of a PDCP layer;

reconfiguring the PDCP layer and transmitting an end-marker (EM), by the user equipment.

In a second aspect, an embodiment of the present disclosure provides a reconfiguration method, including:

transmitting, by a network device, a reconfiguration instruction, where the reconfiguration instruction is used to instruct a user equipment to reconfigure a PDCP layer;

receiving, by the network device, an EM from the user equipment.

In a third aspect, an embodiment of the present disclosure provides a reconfiguration method, including:

receiving, by a user equipment, a reconfiguration instruction from a network device, where the reconfiguration instruction is used to instruct reconfiguration of a PDCP layer;

reconfiguring the PDCP layer and receiving an EM from the network device, by the user equipment.

In a fourth aspect, an embodiment of the present disclosure provides a reconfiguration method, including:

transmitting, by the network device, a reconfiguration instruction, where the reconfiguration instruction is used to instruct a user equipment to reconfigure a PDCP layer;

transmitting, by the network device, an EM.

In a fifth aspect, an embodiment of the present disclosure provides a user equipment, including a processing unit and a communication unit, where the processing unit is configured to: receive a reconfiguration instruction from a network device via the communication unit, wherein the reconfiguration instruction is used to instruct reconfiguration of a PDCP layer; reconfigure the PDCP layer, and transmit an EM via the communication unit.

In a sixth aspect, an embodiment of the present disclosure provides a network device, including a processing unit and a communication unit, where the processing unit is configured to: transmit a reconfiguration instruction via the communication unit to a user equipment, where the reconfiguration instruction is used to reconfigure a PDCP layer; and receive an EM from the user equipment via the communication unit.

In a seventh aspect, an embodiment of the present disclosure provides a user equipment, including a processing unit and a communication unit, where the processing unit is configured to, receive, a reconfiguration instruction from a network device via the communication unit, wherein the reconfiguration instruction is used to instruct reconfiguration of a PDCP layer; reconfigure the PDCP layer, and receive an EM from the network device via the communication unit.

In an eighth aspect, an embodiment of the present disclosure provides a network device, including a processing unit and a communication unit, where the processing unit is configured to: transmit a reconfiguration instruction via the communication unit, where the reconfiguration instruction is used to instruct a user equipment to reconfigure a PDCP layer; and transmit an EM via the communication unit.

In a ninth aspect, an embodiment of the present disclosure provides a user equipment, including a processor, a memory, a transceiver, and one or more programs, where the one or more programs are stored in the memory and are configured to be executed by the processor, the one or more programs including an instruction for performing the steps in the method as described in the first aspect of embodiments of the disclosure.

In a tenth aspect, an embodiment of the present disclosure provides a network device, including a processor, a memory, a transceiver, and one or more programs, where the one or more programs are stored in the memory and are configured to be executed by the processor, the one or more programs including an instruction for performing the steps in the method as described in the second aspect of embodiments of the disclosure.

In an eleventh aspect, an embodiment of the present disclosure provides a user equipment, including a processor, a memory, a transceiver, and one or more programs, wherein the one or more programs are stored in the memory and are configured to be executed by the processor, the one or more programs including an instruction for performing the steps in the method as described in the third aspect of embodiments of the disclosure.

In a twelfth aspect, an embodiment of the present disclosure provides a network device, including a processor, a memory, a transceiver, and one or more programs, where the one or more programs are stored in the memory and are configured to be executed by the processor, the one or more programs including an instruction for performing the steps in the method as described in the fourth aspect of embodiments of the disclosure.

In a thirteenth aspect, an embodiment of the present disclosure provides a computer readable storage medium storing a computer program for electronic data exchange, where the computer program causes a computer to perform some or all steps as described in the first aspect of embodiments of the present disclosure, and the computer includes a user equipment.

In a fourteenth aspect, an embodiment of the present disclosure provides a computer readable storage medium storing a computer program for electronic data exchange, where the computer program causes a computer to perform some or all steps as described in the second aspect of embodiments of the present disclosure, and the computer includes a network device.

In a fifteenth aspect, an embodiment of the present disclosure provides a computer readable storage medium storing a computer program for electronic data exchange, where the computer program causes a computer to perform some or all steps as described in the third aspect of embodiments of the present disclosure, and the computer includes a user equipment.

In a sixteenth aspect, an embodiment of the present disclosure provides a computer readable storage medium storing a computer program for electronic data exchange, where the computer program causes a computer to perform some or all steps as described in the fourth aspect of embodiments of the present disclosure, and the computer includes a network device.

In a seventeenth aspect, an embodiment of the present disclosure provides a computer program product including a non-transitory computer readable storage medium storing a computer program, where the computer program may be executed to cause a computer to perform some or all steps as described in the first aspect of embodiments of the present disclosure, and the computer program product may be a software installation package, and the computer includes a user equipment.

In an eighteenth aspect, an embodiment of the present disclosure provides a computer program product including a non-transitory computer readable storage medium storing a computer program, where the computer program may be executed to cause a computer to perform some or all steps as described in the second aspect of embodiments of the present disclosure, and the computer program product may be a software installation package, and the computer includes a network device.

In a nineteenth aspect, an embodiment of the present disclosure provides a computer program product including a non-transitory computer readable storage medium storing a computer program, where the computer program is may be executed to cause a computer to perform some or all steps as described in the third aspect of embodiments of the present disclosure, and the computer program product may be a software installation package, and the computer includes a user equipment.

In a twentieth aspect, an embodiment of the present disclosure provides a computer program product including a non-transitory computer readable storage medium storing a computer program, where the computer program may be executed to cause a computer to perform some or all steps as described in the fourth aspect of embodiments of the present disclosure, and the computer program product may be a software installation package, and the computer includes a network device.

These and other aspects of the present application will be more readily apparent from the following description of embodiments.

BRIEF DESCRIPTION OF DRAWINGS

In order to more clearly illustrate the technical solutions in the embodiments of the present disclosure, the drawings required for describing the embodiments will be briefly described below. Obviously, the accompanying drawings described below are some embodiments of the present disclosure, and persons of ordinary skill in the art may still derive other drawings from these accompanying drawings without creative efforts.

DESCRIPTION OF EMBODIMENTS

To make those skilled in the art better understand the technical solutions of the present application, the following clearly and completely describes the technical solutions in the embodiments according to the present application with reference to the accompanying drawings in the embodiments according to the present application. Apparently, the described embodiments are some but not all of the embodiments according to the present application. All other embodiments obtained by persons of ordinary skill in the art based on the embodiments according to the present application without creative efforts shall fall within the protection scope of the present application.

The details are described below respectively.

The terms "first", "second", "third", and "fourth" and the like in the specification, the claims and the drawings of the present application are used to distinguish different objects, rather than describe a specific order. Furthermore, the terms "including", "comprising", "having" and any variation thereof are intended to reference a non-exclusive inclusion. For example, a process, a method, a system, a product, or a device including a series of steps or units is not limited to the listed steps or units, but optionally also includes steps or units that are not listed, or optionally includes other steps or units inherent to such process, method, product or device.

References to "an embodiment" herein mean that a particular feature, structure, or characteristic described in connection with the embodiment can be included in at least one embodiment of the present application. Such phrase appearing in various places throughout the specification is not necessarily all referring to a same embodiment, nor necessarily is a separate or an alternative embodiment mutually exclusive of other embodiments. Those skilled in the art will understand, explicitly and implicitly, that the embodiments described herein can be combined with other embodiments.

Embodiments of the present application will be described below with reference to the accompanying drawings.

Figure 1:
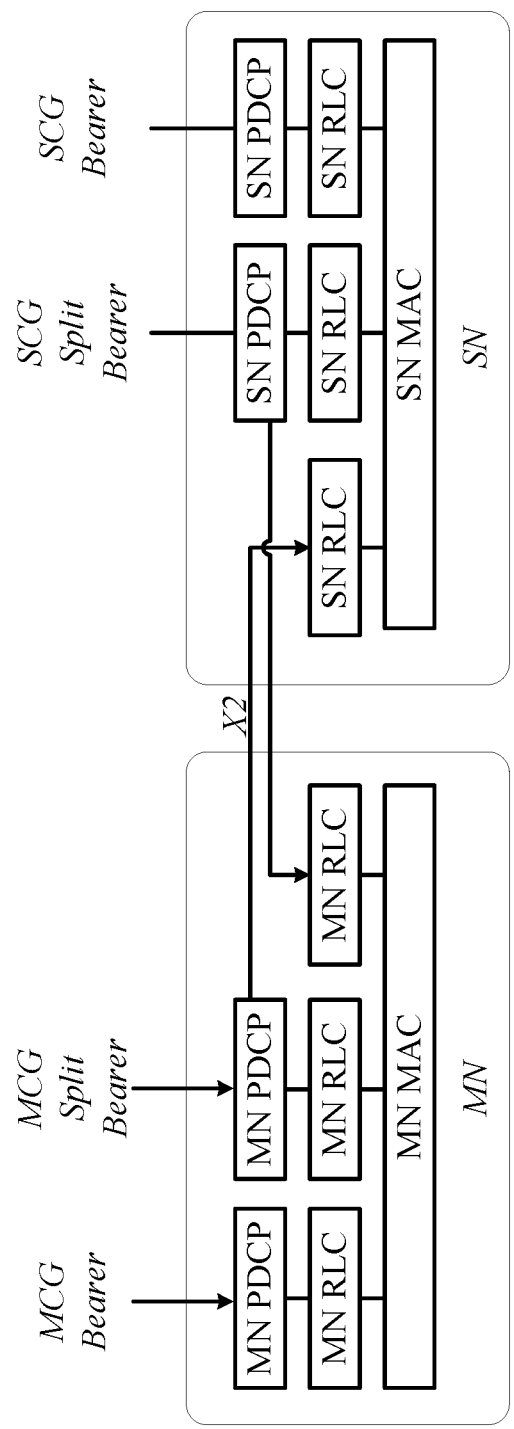
FIG. 1 is a schematic diagram of a protocol stack structure according to an embodiment of the present disclosure.

In the system architecture of LTE and DC, a user equipment can maintain connection with LTE and NR systems simultaneously. Their protocol stack structures are shown in FIG. 1, where a master node (MN) and a slave node (SN) are LTE and NR respectively. At the LTE side, the physical layer (PHY), the Media Access Control (MAC) layer, and the Radio Link Control protocol (RLC) layer are all of LTE version. However, for the PDCP layer, whether to directly use the protocol PDCP of the LTE version requires further consideration. LTE PDCP cannot be hosted on the NR RLC, so there is a need to use the NR PDCP. But considering the adaptability of the LTE PDCP to voice services and that the LTE PDCP is suitable as an initial configuration during initial access, the LTE PDCP is also necessary. In order to achieve configurability of the LTE PDCP and the NR PDCP, the currently available solution is to reset all bearers based on the handover procedure. However, considering that the reconfiguration of PDCP may only involve individual bearers, if all the bearers are interrupted due to resetting the PDCP layer, the data continuity of all services will be affected. In FIG. 1, MCG Bearer is a Master Cell Group bearer, MCG Split Bearer is a Master Cell Group Split bearer, SCG Bearer is a Secondary Cell Group bearer, and SCG Split Bearer is a Secondary Cell Group Split bearer.

Figure 2:
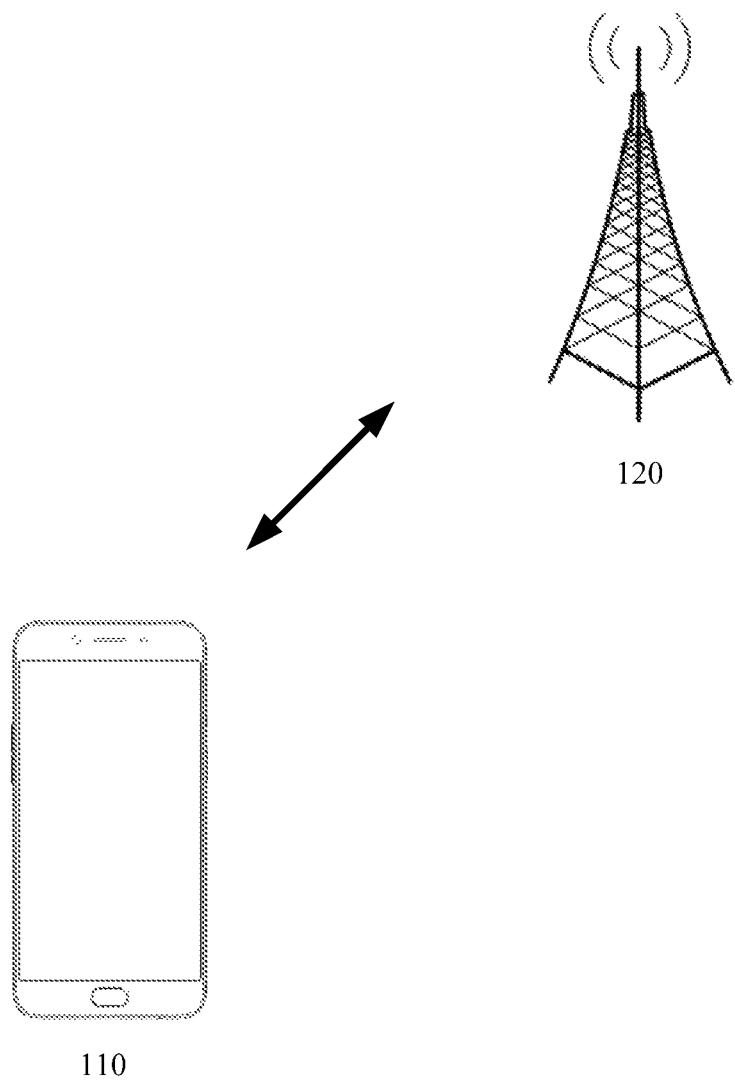
FIG. 2 is a schematic diagram of a network architecture according to an embodiment of the present disclosure.

Referring to FIG. 2, FIG. 2 is a schematic diagram of a network architecture disclosed in an embodiment of the present application. The network architecture shown in FIG. 2 includes a user equipment 110 and a network device 120. In order to solve the above problem, in an example, the network device 120 transmits a reconfiguration instruction, where the reconfiguration instruction is used to instruct reconfiguration of the PDCP layer; the user equipment 110 receives the reconfiguration instruction from the network device 120, and then reconfigures the PDCP layer, and finally the user equipment 110 transmits an End-marker (EM). It can be seen that, in this solution, when reconfiguring the PDCP layer, it is not necessary to reset all bearers (for example, it is not required to reconfigure the RLC layer and the MAC layer, and existing transmissions in the RLC layer and the MAC layer remain), and only the PDCP layer needs to be reconfigured, preventing other bearers from being affected due to a change in the PDCP layer, thereby ensuring data continuity of other services.

In addition, in order to solve the above problem, in another example, the network device 120 transmits a reconfiguration instruction, where the reconfiguration instruction is used to instruct reconfiguration of the PDCP layer; the user equipment 110 receives the reconfiguration instruction from the network device 120, and then reconfigures the PDCP layer; and finally the user equipment 110 receives an EM from the network device 120. It can be seen that, in this solution, when reconfiguring the PDCP layer, it is not necessary to reset all bearers (for example, it is not required to reconfigure the RLC layer and the MAC layer, and existing transmissions in the RLC layer and the MAC layer remain), and only the PDCP layer needs to be reconfigured, preventing other bearers from being affected due to a change in the PDCP layer, thereby ensuring data continuity of other services.

Where the user equipment is a device that provides voice and/or data connectivity to the user, for example, a handheld device and an in-vehicle device with wireless connection functions, and the like. Common user equipment includes, for example, a mobile phone, a tablet, a notebook computer, a PDA, a mobile internet device (MID), and a wearable devices such as smart watch, a smart bracelet, a pedometer, and the like.

Where the network device refers to a node device at the network side. For example, the network device may be a radio access network (RAN) device at the access network side in the cellular network, and the so-called RAN device is a device that makes the user equipment access to a wireless network, including but not limited to: an evolved Node B (eNB), a radio network controller (RNC), a Node B (NB), a base station controller (BSC), a Base Transceiver Station (BTS), a Home Base Station (for example, a Home evolved NodeB, or a Home Node B (FMB)), a Baseband Unit (BBU), and a Mobility Management Entity (MME); for another example, the network device may also be a node device in a Wireless Local Area Network (WLAN), such as an access controller (AC), a gateway, or a WIFI access point (AP).

The reconfiguration method according to an embodiment of the present application is described in detail below with reference to the network architecture shown in FIG. 1.

Figure 3:
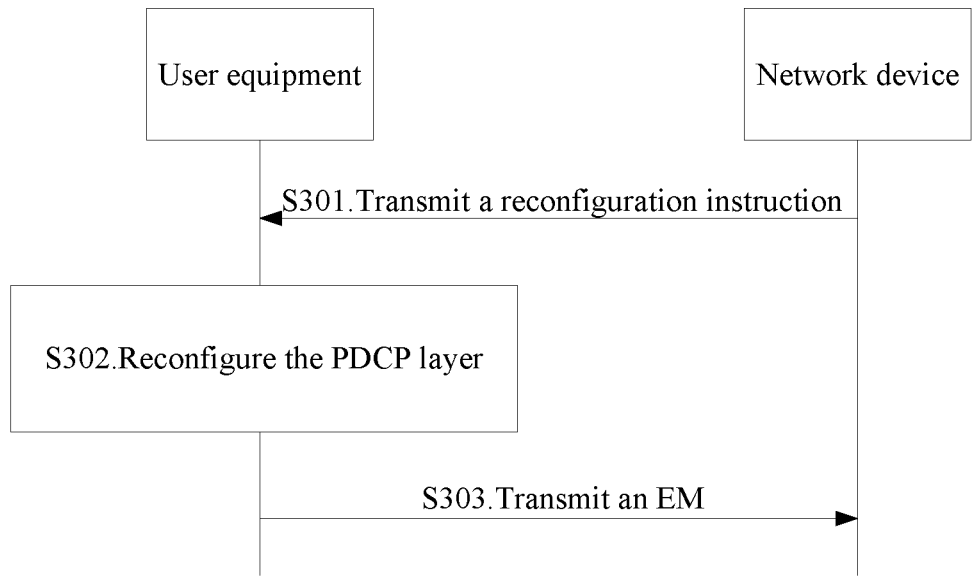
FIG. 3 is a schematic flowchart diagram of a reconfiguration method according to an embodiment of the present disclosure.

Referring to FIG. 3, FIG. 3 is a schematic flowchart diagram of a reconfiguration method according to an embodiment of the present application. The reconfiguration method includes the following steps:

Step S301: a network device transmits a reconfiguration instruction, where the reconfiguration instruction is used to instruct a user equipment to reconfigure a PDCP layer.

Where the network device transmitting the reconfiguration instruction may be the network device transmitting the reconfiguration instruction directly to the user equipment, or may be the network device transmitting the reconfiguration instruction to the user equipment via other device, which is not limited herein.

Where the reconfiguration instruction may include at least one of the followings: a key, an integrity check information parameter, a relevant parameter of a transition between the LTE PDCP and the NR PDCP, and the like. Integrity check refers to the method of verifying data integrity using a specified algorithm to ensure data integrity. The integrity check information parameter refers to a variable and a set value in the check algorithm. When the PDCP layer changes from the LTE PDCP to the NR PDCP, the relevant parameter of the transition between LTE PDCP and NR PDCP is a relevant parameter of the NR PDCP. When the PDCP layer changes from the NR PDCP to the LTE PDCP, the relevant parameter of the transition between the LTE PDCP and the NR PDCP are a relevant parameter of the LTE PDCP.

Step S302: the user equipment receives the reconfiguration instruction from the network device and reconfigures the PDCP layer.

In particular, when the reconfiguration instruction includes the relevant parameter of the NR PDCP, the user equipment reconfigures the PDCP layer, specifically: when the current PDCP layer of the user equipment is the LTE PDCP, the user equipment switches the PDCP layer from the LTE PDCP to the NR PDCP according to the relevant parameter of the NR PDCP. Or, when the reconfiguration instruction includes the relevant parameter of the LTE PDCP, the user equipment reconfigures the PDCP layer, specifically: when the current PDCP layer of the user equipment is the NR PDCP, the user equipment switches the PDCP layer from the NR PDCP to the LTE PDCP according to the relevant parameter of LTE PDCP.

Step S303: the user equipment transmits an EM, and the network device receives the EM from the user equipment.

Where the EM is a special data packet which is used to indicate that the data from the transmitting source side (in this case, the user equipment side) ends. If the user equipment switches the PDCP layer from the LTE PDCP to the NR PDCP, the user equipment transmits an EM indicating that the LTE PDCP PDU of the user equipment ends. If the user equipment switches the PDCP layer from NR PDCP to LTE PDCP, the user equipment transmits an EM indicating that the NR PDCP PDU of the user equipment ends.

It can be seen that, in this solution, when reconfiguring the PDCP layer, it is not necessary to reset all bearers (for example, it is not required to reconfigure the RLC layer and the MAC layer, and existing transmissions in the RLC layer and the MAC layer remain), and only the PDCP layer needs to be reconfigured, preventing other bearers from being affected due to a change in the PDCP layer, thereby ensuring data continuity of other services.

In an example, when the EM is only defined in the NR PDCP protocol, and reconfiguration of the PDCP layer of the user equipment is to switch from the LTE PDCP to the NR PDCP, the method, before the user equipment transmits the EM, further includes:

the user equipment performing resetting processing, where the resetting processing includes at least one of: resetting a Robust Header Compression (ROHC), resetting a Protocol Data Unit (PDU) sequence number (SN), and resetting a Hyper Frame Number (HFN).

In an example, when the EM is only defined in the NR PDCP protocol, and reconfiguration of the PDCP layer of the user equipment is to switch from the NR PDCP to the LTE PDCP, or when the EM is defined in both the NR PDCP protocol and the LTE PDCP protocol, the method, after the user equipment transmits the EM, further includes:

the user equipment performs resetting processing, where the resetting processing includes at least one of: resetting the Robust Header Compression (ROHC), resetting the PDU sequence number (SN), and resetting the Hyper Frame Number (HFN).

Where the resetting the Robust Header Compression (ROHC) refers to restoring the Robust Header Compression to an initial state. The specific implementation in which the user equipment restores the Robust Header Compression to the initial state can refer to the existing practice, which will not be described here.

Where the resetting the PDU sequence number refers to restoring the PDU sequence number to an initial state. For example, if currently the user equipment transmits PDU sequence numbers from 0 to 10, then the restoring the PDU sequence number to the initial state is restoring the PDU sequence number of the user equipment to PDU sequence number 0.

Where the resetting the Hyper Frame Number refers to restoring the Hyper Frame Number to an initial state. The Hyper Frame Number refers to a counter overflow mechanism for limiting the number of bits of sequence numbers transmitted through a radio interface. The HFN is a counter that is large enough to limit the number of bits of serial numbers transmitted through the radio interface when the serial numbers transmitted through the radio interface are transmitted between the user equipment and the network device. The restoring the HFN is setting the counter to zero.

In an example, after the user equipment performs the resetting processing, the method further includes:

the network device transmits a status report, the user equipment receives the status report from the network device, and the user equipment transmits a PDU according to the status report.

Specifically, the status report is used to indicate that the receiving end side (in this solution, the network device side) has received the EM transmitted by the transmitting end side (in this solution, the user equipment side). After the user equipment receives the status report from the network device, the user equipment knows that the network device has received the EM, and until then the user equipment transmits the PDU to the network device, so that the PDU transmitted by the user equipment is synchronized with the mode of the user equipment. For example, the user equipment switches from the LTE PDCP to the NR PDCP, and after receiving the status report, the user equipment transmits an NR PDCP PDU to the network device.

In an example, the reconfiguration instruction includes a key and/or an integrity check information parameter, and the method further includes:

the user equipment preforms encryption processing on a PDU to be transmitted according to the key; and/or, the user equipment performs integrity check processing on the PDU to be transmitted according to the integrity check information parameter; the user equipment transmits the processed PDU; the network device receives the PDU transmitted by the user equipment; the network device performs decryption processing on the received PDU according to the key; and/or, the network device performs integrity check processing on the received PDU according to the integrity check information parameter.

In particular, the user equipment performs the integrity check processing on the PDU to be transmitted according to the integrity check information parameter, specifically including: the user equipment calculates an integrity check code using the key provided by an upper layer, and then attaches the integrity check code to the PDCP PDU and transmits it along with the PDCP PDU.

In an example, the method further includes:

the user equipment transmits an LTE PDCP PDU from the PDCP layer of the user equipment to the RLC layer of the LTE-side of the user equipment.

Specifically, the user equipment transmits a PDU both before step S301 and after step S303. In this solution, the LTE PDCP PDU is transmitted only from the PDCP layer of the user equipment to the RLC layer of the LTE-side of the user equipment, and the RLC layer of the LTE-side of the user equipment transmits the LTE PDCP PDU downwards so that the LTE PDCP PDU is transmitted to the network device side. For the NR PDCP PDU, the user equipment may transmit it from the PDCP layer of the user equipment to the RLC layer of the LTE-side of the user equipment, or from the PDCP layer of the user equipment to the RLC layer of the NR-side of the user equipment, which is not limited herein.

Since the LTE system and the 5G/NR system use different PDCP PDU formats, the following error cases should be avoided, considering that the version of PDCP is changed from the LTE system to the 5G/NR system. Error 1: The 5G/NR PDCP PDU arrives at the PDCP entity at the receiving end before the EM; Error 2: The LTE PDCP PDU arrives at the PDCP entity at the receiving end after the EM. Considering that in-order delivery can be implemented in the RLC layer at the LTE side, the problem of error 2 can be solved by submitting the EM and the LTE PDCP PDU to the LTE RLC layer. For error 1, considering that in-order delivery cannot be implemented in the RLC layer at the NR side, therefore, the transmitting PDCP entity only needs to ensure that the LTE PDCP PDU is not transmitted to the RLC at the NR-side. The receiving PDCP entity will only process the PDCP PDU from the RLC layer of the NR-side as an NR PDCP PDU. In this way, since the version of the PDCP is changed from LTE to NR, even if any NR PDCP PDU arrives at the PDCP entity before the EM, the NR PDCP PDU being treated as an LTE PDCP PDU and then erroneously processed will not happen.

In an example, the user equipment transmits the EM, specifically including:

the user equipment transmits the EM from the PDCP layer of the user equipment to the RLC layer of the LTE-side of the user equipment.

Specifically, the user equipment transmits the EM in a same way as the user equipment transmits the LTE PDCP PDU. The user equipment only transmits the EM from the PDCP layer of the user equipment to the RLC layer of the LTE-side of the user equipment, and the LTE-side RLC layer of the user equipment transmits the EM downward, so that the EM is transmitted to the network device side.

In an example, the EM does not include a log sequence number (LSN) field, and a PDU type included in the EM is different from a PDU type included in an EM defined in the LTE protocol; or the EM includes an LSN field, and each LSN field included in the EM is set to a set value.

Figure 4:
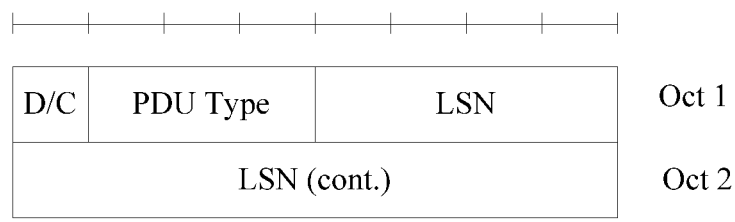
FIG. 4 is a schematic diagram of an EM format defined by the existing LTE according to an embodiment of the present disclosure.

Specifically, the EM format defined by the existing LTE is as shown in FIG. 4. The LSN is a sequence number of the last PDU before the EM is transmitted. In this solution, since the LTE-side RLC can provide an in-order transmission, and a change in the SN length due to a PDCP reset causes that a lossless reconfiguration cannot be achieved, the LSN becomes unnecessary. Therefore, the EM in this solution may not include an LSN field to reduce data overhead. In this way, in order to make the EM in this solution coexist with the EM with an LSN field, a PDU type in the EM in this solution needs to be redefined to distinguish from the PDU type included in the EM defined in the existing LTE protocol. For example, the PDU type included in the EM is defined as PDU type1 in the existing LTE protocol, while the PDU type included in the EM in this solution is PDU type 2, and the PDU type1 is different from the PDU type 2.

In another implementation, the EM in this solution may still use an LSN field, but each the LSN field is set to a set value. For example, each is set to 0 or 1. In this way, since each the LSN field is set to a set value, distinguishing the EM in this solution from the EM defined in the existing LTE protocol, there is no need to redefine a PDU type to distinguish from the EM defined in the existing LTE protocol.

In an example, when reconfiguring the PDCP layer is to change from the an LTE PDCP to the NR PDCP, a format of the status report is a format of an NR PDCP status report; or, when reconfiguring the PDCP layer is to change from the NR PDCP to the LTE PDCP, a format of the status report is a format of a LIE PDCP status report.

Figure 5:
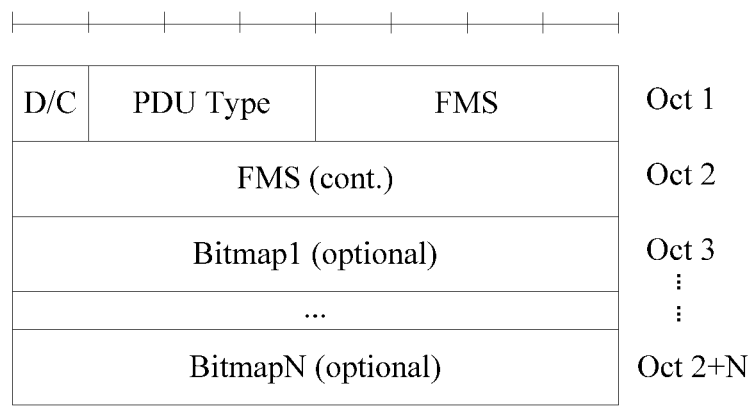
FIG. 5 is a schematic diagram of a status report format of LTE according to an embodiment of the present disclosure.
Figures 6, 7:
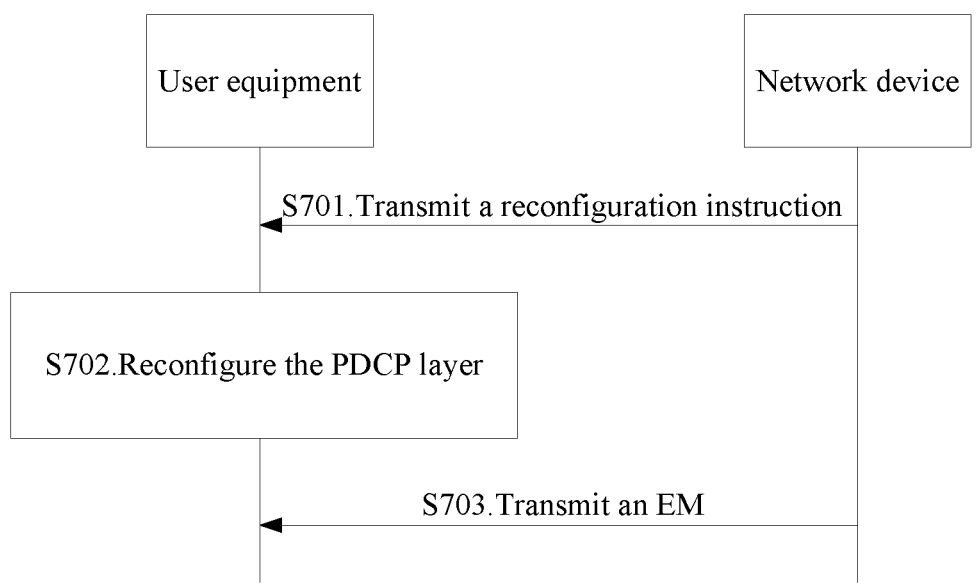
FIG. 6 is a schematic diagram of a status report format of NR according to an embodiment of the present disclosure.
FIG. 7 is a schematic flowchart diagram of another reconfiguration method according to an embodiment of the present disclosure.

Specifically, a format for a status report in LTE is as shown in FIG. 5. A format for a status report in NR is shown in FIG. 6. For a non-split bearer, since there is only one LTE RLC entity, in-order submission on a lower layer can be guaranteed, so no status report is required. For a split bearer, due to the existence of an NR RLC entity, in-order submission on a lower layer cannot be guaranteed, thus a status report is required. During a switch from the LTE PDCP to the NR PDCP, an NR PDCP status report format is used, where the NR PDCP status report includes a COUNT value, which can be obtained from a COUNT value of a packet transmitted by LTE PDCP or can be set to zero, or the NR PDCP status report does not includes a COUNT value (this requires an additionally defined PDU type). During a switch from the NR PDCP to the LTE PDCP, a LTE PDCP status report format is used, where the LTE PDCP status report includes a SN value, which is obtained from an SN value of a packet transmitted by NR PDCP or is set to zero, or the LTE PDCP status report does not include an SN value (this requires an additionally defined PDU type). Where the COUNT is composed of an HFN and a PDCP SN.

In an example, when reconfiguring the PDCP layer is to change from the LTE PDCP to the NR PDCP, a format of the EM is a format of an LTE PDCP EM; or, when reconfiguring the PDCP layer is to change from the NR PDCP to the LTE PDCP, a format of the EM is a format of an NR PDCP EM.

Where the LTE PDCP EM includes an LSN field, and the NR PDCP EM does not include an LSN field, or the NR PDCP EM includes a COUNT value.

Referring to FIG. 7, FIG. 7 is a schematic flowchart diagram of a reconfiguration method according to an embodiment of the present application, which includes the following steps:

Step S701: a network device transmits a reconfiguration instruction, where the reconfiguration instruction is used to instruct a user equipment to reconfigure a PDCP layer.

Where the network device transmitting the reconfiguration instruction may be the network device directly transmitting the reconfiguration instruction to the user equipment, or be the network device transmitting the reconfiguration instruction to the user equipment via other device, which is not limited herein.

Where the reconfiguration instruction may include at least one of the followings: a key, an integrity check information parameter, a relevant parameter of a transition between the LTE PDCP and the NR PDCP, and the like. Integrity check refers to the method of verifying data integrity using a specified algorithm to ensure data integrity. The integrity check information parameter refers to a variable and a set value in the check algorithm. When the PDCP layer changes from the LTE PDCP to the NR PDCP, the relevant parameter of the transition between LTE PDCP and NR PDCP is a relevant parameter of the NR PDCP. When the PDCP layer changes from the NR PDCP to the LTE PDCP, the relevant parameter of the transition between the LTE PDCP and the NR PDCP are a relevant parameter of the LTE PDCP.

Step S702: the user equipment receives the reconfiguration instruction from the network device and reconfigures the PDCP layer.

In particular, when the reconfiguration instruction includes the relevant parameter of the NR PDCP, the user equipment reconfigures the PDCP layer, specifically: when the current PDCP layer of the user equipment is the LTE PDCP, the user equipment switches the PDCP layer from the LTE PDCP to the NR PDCP according to the relevant parameter of the NR PDCP. Or, when the reconfiguration instruction includes the relevant parameter of the LTE PDCP, the user equipment reconfigures the PDCP layer, specifically: when the current PDCP layer of the user equipment is the NR PDCP, the user equipment switches the PDCP layer from the NR PDCP to the LTE PDCP according to the relevant parameter of LTE PDCP.

Step S703: the network device transmits an EM, the user equipment receives the EM from the network device.

Where the EM is a special data packet which is used to indicate that the data from the transmitting source side (in this case, the network device side) ends.

It can be seen that, in this solution, when reconfiguring the PDCP layer, it is not necessary to reset all bearers (for example, it is not required to reconfigure the RLC layer and the MAC layer, and existing transmissions in the RLC layer and the MAC layer remain), and only the PDCP layer needs to be reconfigured, preventing other bearers from being affected due to a change in the PDCP layer, thereby ensuring data continuity of other services.

In an example, when the EM is only defined in the new radio (NR) PDCP protocol, and reconfiguration of the PDCP layer of the user equipment is to switch from the LTE PDCP to the NR PDCP, the method, before the user equipment receives the EM from the network device, further includes:

the user equipment performs resetting processing, where the resetting processing includes at least one of: resetting a Robust Header Compression (ROHC), resetting a Protocol Data Unit (PDU) sequence number (SN), and resetting a Hyper Frame Number (HFN).

In an example, when the EM is only defined in the NR PDCP protocol, and reconfiguration of the PDCP layer of the user equipment is to switch from the NR PDCP to the LTE PDCP, or when the EM is defined in both the NR PDCP protocol and the LTE PDCP protocol, the method, after the user equipment receives the EM from the network device, further includes:

the user equipment preforms resetting processing, where the resetting processing include at least one of: resetting the Robust Header Compression (ROHC), resetting the PDU sequence number (SN), and resetting the Hyper Frame Number (HFN).

Where the resetting the Robust Header Compression (ROHC) refers to restoring the Robust Header Compression to an initial state. The specific implementation in which the user equipment restores the Robust Header Compression to the initial state can refer to the existing practice, which will not be described here.

Where the resetting the PDU sequence number refers to restoring the PDU sequence number to an initial state. For example, if currently the user equipment transmits PDU sequence numbers from 0 to 10, then the restoring the PDU sequence number to the initial state is restoring the PDU sequence number of the user equipment to PDU sequence number 0.

Where the resetting the Hyper Frame Number refers to restoring the Hyper Frame Number to an initial state. The Hyper Frame Number refers to a counter overflow mechanism for limiting the number of bits of sequence numbers transmitted through a radio interface. The HFN is a counter that is large enough to limit the number of bits of serial numbers transmitted through the radio interface when the serial numbers transmitted through the radio interface are transmitted between the user equipment and the network device. The restoring the HFN is setting the counter to zero.

In an example, after the user equipment performs the resetting processing, the method further includes:

the user equipment transmits a status report to the network device, where the status report is used by the network device to determine a PDU to be transmitted to the user equipment; the network device receives the status report from the user equipment; the network device transmits a PDU according to the status report.

Specifically, the status report is used to indicate that the receiving end side (in this solution, the user equipment side) has received the EM transmitted by the transmitting end side (in this solution, the network device side). After the network device receives the status report from the user equipment, the network device knows that the user equipment has received the EM, and until then the network device transmits the PDU to the user equipment, so that the PDU transmitted by the network device is synchronized with the mode of the network device.

In an example, the reconfiguration instruction includes a key and/or an integrity check information parameter, and the method further includes:

the network device performs encryption processing on a PDU to be transmitted according to the key; and/or, the network device performs integrity check processing on the received PDU according to the integrity check information parameter;

the network device transmits the processed PDU;

the user equipment receives the PDU from the network device;

the user equipment performs decryption processing on the received PDU according to the key; and/or, the user equipment performs integrity check processing on the received PDU according to the integrity check information parameter.

Specifically, the network device performs the integrity check processing on the PDU to be transmitted, according to the integrity check information parameter, including: the network device calculates an integrity check code using the key provided by the upper layer, and then performs an integrity check code comparison on the received PDCP PDU according to the integrity check code, and if the integrity check code corresponds to the received PDCP PDU, the integrity check succeeds.

In an example, the EM does not include an LSN field, and a PDU type included in the EM is different from a PDU type included in an EM defined in the LTE protocol; or the EM includes an LSN field, and each LSN field included in the EM is set to a set value.

Specifically, the EM format defined by the existing LTE is as shown in FIG. 4. The LSN is a sequence number of the last PDU before the EM is transmitted. In this solution, since the LTE-side RLC can provide an in-order transmission, and a change in the SN length due to a PDCP reset causes that a lossless reconfiguration cannot be achieved, the LSN becomes unnecessary. Therefore, the EM in this solution may not include an LSN field to reduce data overhead. In this way, in order to make the EM in this solution coexist with the EM with an LSN field, a PDU type in the EM in this solution needs to be redefined to distinguish from the PDU type included in the EM defined in the existing LTE protocol. For example, the PDU type included in the EM is defined as PDU type1 in the existing LTE protocol, while the PDU type included in the EM in this solution is PDU type2, and the PDU type1 is different from the PDU type2.

In another implementation, the EM in this solution may still use an LSN field, but each the LSN field is set to a set value. For example, each is set to 0 or 1. In this way, since each the LSN field is set to a set value, distinguishing the EM in this solution from the EM defined in the existing LTE protocol, there is no need to redefine a PDU type to distinguish from the EM defined in the existing LTE protocol.

In an example, when reconfiguring the PDCP layer is to change from the LTE PDCP to the NR PDCP, a format of the status report is a format of an NR PDCP status report; or, when reconfiguring the PDCP layer is to change from the NR PDCP to LTE the PDCP, a format of the status report is a format of a LTE PDCP status report.

Specifically, a format for a status report in LTE is as shown in FIG. 5. A format for a status report in NR is shown in FIG. 6. For a non-split bearer, since there is only one LTE RLC entity, in-order submission on a lower layer can be guaranteed, so no status report is required. For a split bearer, due to the existence of an NR RLC entity, in-order submission on a lower layer cannot be guaranteed, thus a status report is required. During a switch from the LTE PDCP to the NR PDCP, an NR PDCP status report format is used, where the NR PDCP status report includes a COUNT value, which can be obtained from a COUNT value of a packet transmitted by LTE PDCP or can be set to zero, or the NR PDCP status report does not includes a COUNT value (this requires an additionally defined PDU type). During a switch from the NR PDCP to the LTE PDCP, a LTE PDCP status report format is used, where the LTE PDCP status report includes a SN value, which is obtained from an SN value of a packet transmitted by NR PDCP or is set to zero, or the LTE PDCP status report does not include an SN value (this requires an additionally defined PDU type). Where the COUNT is composed of an HFN and a PDCP SN.

In an example, when reconfiguring the PDCP layer is to change from the LTE PDCP to the NR PDCP, a format of the EM is a format of an LTE PDCP EM; or, when reconfiguring the PDCP layer is to change from the NR PDCP to the LTE PDCP, a format of the EM is a format of an NR PDCP EM.

Where the LTE PDCP EM includes an LSN field, and the NR PDCP EM does not include an LSN field, or the NR PDCP EM includes a COUNT value.

Figure 8:
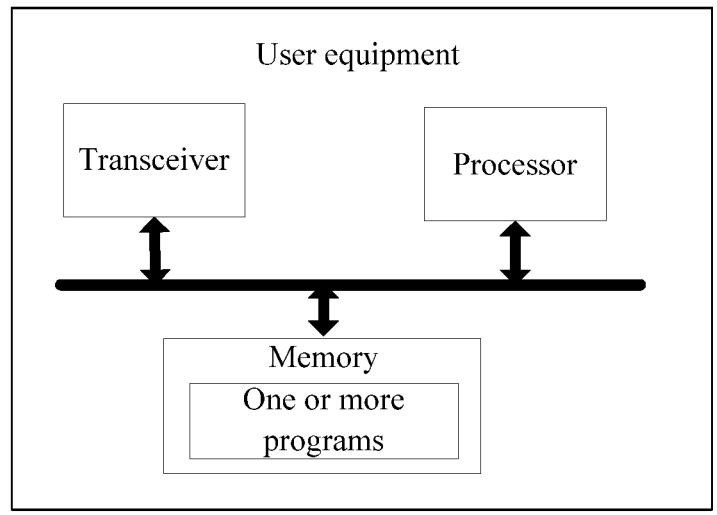
FIG. 8 is a schematic structural diagram of a user equipment according to an embodiment of the present disclosure.

Referring to FIG. 8, FIG. 8 is a user equipment according to an embodiment of the present disclosure, which includes: one or more processors, one or more memories, one or more transceivers, and one or more programs;

the one or more programs are stored in the memories and configured to be executed by the one or more processors;

the program includes an instruction for performing the following steps:

receiving a reconfiguration instruction from a network device, where the reconfiguration instruction is used to instruct reconfiguration on a Packet Data Convergence Protocol (PDCP) layer;

reconfiguring the PDCP layer and transmitting an end-marker (EM).

In an example, when the EM is only defined in the NR PDCP protocol, and reconfiguration of the PDCP layer of the user equipment is to switch from LTE PDCP to NR PDCP, the programs, before the EM is transmitted, further include an instruction for performing the following steps:

performing resetting processing including at least one of: resetting a Robust Header Compression (ROHC), resetting a Protocol Data Unit (PDU) sequence number (SN), and resetting a Hyper Frame Number (HFN).

In an example, when the EM is only defined in the NR PDCP protocol, and reconfiguration of the PDCP layer for the user equipment is to switch from NR PDCP to LTE PDCP, or when the EM is defined in both the NR PDCP protocol and the LTE PDCP protocol, the programs, after the EM is transmitted, further include an instruction for performing the following steps:

performing resetting processing including at least one of: resetting the Robust Header Compression (ROHC), resetting the PDU sequence number (SN), and resetting the Hyper Frame Number (HFN).

In an example, after the resetting processing is performed, the programs include an instruction for performing the following steps:

receiving a status report from the network device;

transmitting a PDU according to the status report.

In an example, the reconfiguration instruction includes a key and/or an integrity check information parameter, and the programs include an instruction for performing the following steps:

performing encryption processing on a PDU to be transmitted, according to the key; and/or, the user equipment performing integrity check processing on the PDU to be transmitted, according to the integrity check information parameter; and transmitting the processed PDU.

In an example, the programs include an instruction for performing the following steps:

transmitting an LTE PDCP PDU from a PDCP layer of the user equipment to an RLC layer of the LTE-side of the user equipment.

In an example, in terms of the transmitting an EM, the programs include an instruction specifically for performing the following step: transmitting an EM from a PDCP layer of the user equipment to an RLC layer of the LTE-side of the user equipment.

In an example, the EM does not include an LSN field, and a PDU type included in the EM is different from a PDU type included in an EM defined in the LTE protocol; or the EM includes an LSN field, and each LSN field included in the EM is set to a set value.

In an example, when the reconfiguring the PDCP layer is to change from the LTE PDCP to the NR PDCP, a format of the status report is a format of an NR PDCP status report; or, when the reconfiguring the PDCP layer is to change from the NR PDCP to the LTE PDCP, a format of the status report is a format of a LTE PDCP status report.

In an example, when reconfiguring the PDCP layer is to change from the LTE PDCP to the NR PDCP, a format of the EM is a format of an LTE PDCP EM; or, when reconfiguring the PDCP layer is to change from NR PDCP to LTE PDCP, a format of the EM is a format of an NR PDCP EM.

It can be seen that, in this solution, when reconfiguring the PDCP layer, it is not necessary to reset all bearers (for example, it is not required to reconfigure the RLC layer and the MAC layer, and existing transmissions in the RLC layer and the MAC layer remain), and only the PDCP layer needs to be reconfigured, preventing other bearers from being affected due to a change in the PDCP layer, thereby ensuring data continuity of other services.

Figure 9:
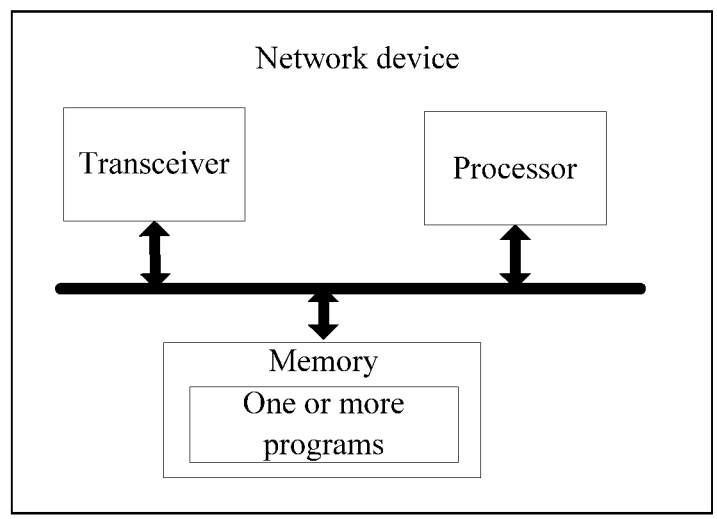
FIG. 9 is a schematic structural diagram of a network device according to an embodiment of the present disclosure.

Referring to FIG. 9, FIG. 9 is a network device according to an embodiment of the present disclosure, which includes: one or more processors, one or more memories, one or more transceivers, and one or more programs;

the one or more programs are stored in the memories and configured to be executed by the one or more processors;

the programs include an instruction for performing the following steps:

transmitting a reconfiguration instruction, where the reconfiguration instruction is used to instruct a user equipment to reconfigure a PDCP layer.

receiving an EM from the user equipment.

In an example, the programs include an instruction for performing the following steps:

transmitting a status report which is used by the user equipment to determine a PDU to be transmitted to the network device.

In an example, the reconfiguration instruction includes a key and/or an integrity check information parameter, and the programs include an instruction for performing the following steps:

receiving a PDU from the user equipment;

decrypting the PDU to be transmitted, according to the key; and/or, performing integrity check processing on the PDU to be transmitted by the user equipment, according to the integrity check information parameter.

In an example, the EM does not include an LSN field, and a PDU type included in the EM is different from a PDU type included in an EM defined in the LTE protocol; or the EM includes an LSN field, and each LSN field included in the EM is set to a set value.

In an example, when the reconfiguring the PDCP layer is to change from an LTE PDCP to NR PDCP, a format of the status report is a format of an NR PDCP status report; or, when the reconfiguring the PDCP layer is to change from the NR PDCP to the LTE PDCP, a format of the status report is a format of a LTE PDCP status report.

In an example, when the reconfiguring the PDCP layer is to change from the LTE PDCP to the NR PDCP, a format of the EM is a format of an LTE PDCP EM; or, when the reconfiguring the PDCP layer is to change from the NR PDCP to the LTE PDCP, a format of the EM is a format of an NR PDCP EM.

It can be seen that, in this solution, when reconfiguring the PDCP layer, it is not necessary to reset all bearers (for example, it is not required to reconfigure the RLC layer and the MAC layer, and existing transmissions in the RLC layer and the MAC layer remain), and only the PDCP layer needs to be reconfigured, preventing other bearers from being affected due to a change in the PDCP layer, thereby ensuring data continuity of other services.

Figure 10:
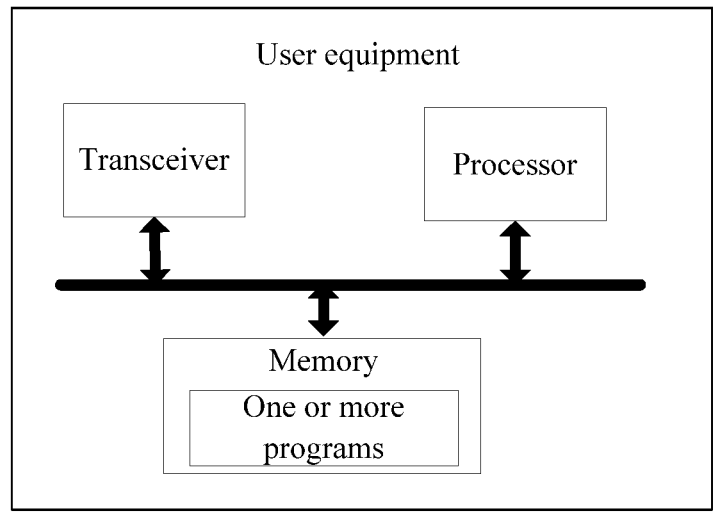
FIG. 10 is a schematic structural diagram of another user equipment according to an embodiment of the present disclosure.

Referring to FIG. 10, FIG. 10 is a user equipment according to an embodiment of the present disclosure, which includes: one or more processors, one or more memories, one or more transceivers, and one or more programs;

the one or more programs are stored in the memories and configured to be executed by the one or more processors;

the programs include an instruction for performing the following steps:

receiving from a network device a reconfiguration instruction, where the reconfiguration instruction is used instruct reconfiguration of a PDCP layer;

reconfiguring the PDCP layer and receiving an EM from the network device.

In an example, when the EM is only defined in the NR PDCP protocol, and reconfiguration of the PDCP layer for the user equipment is to switch from LTE PDCP to NR PDCP, the programs, before the EM is received from the network device, further include an instruction for performing the following steps:

performing resetting processing including at least one of: resetting a Robust Header Compression (ROHC), resetting a Protocol Data Unit (PDU) sequence number (SN), and resetting a Hyper Frame Number (HFN).

In an example, when the EM is only defined in the NR PDCP protocol, and reconfiguration of the PDCP layer for the user equipment is to switch from the NR PDCP to the LTE PDCP, or when the EM is defined in both the NR PDCP protocol and the LTE PDCP protocol, the programs, after the EM is received from the network device, further include an instruction for performing the following steps:

performing resetting processing including at least one of: resetting the Robust Header Compression (ROHC), resetting the Protocol Data Unit (PDU) sequence number (SN), and the resetting a Hyper Frame Number (HFN).

In an example, after the resetting processing is performed, the programs include an instruction for performing the following step:

transmitting to the network device a status report which is used by the network device to determine a PDU to be transmitted to the user equipment.

In an example, the reconfiguration instruction includes a key and/or an integrity check information parameter, and the programs include an instruction for performing the following steps:

receiving a PDU from the network device;

performing decryption processing on the received PDU according to the key; and/or, performing integrity check processing on the received PDU by the user equipment according to the integrity check information parameter.

In an example, the EM does not include an LSN field, and a PDU type included in the EM is different from a PDU type included in an EM defined in the LTE protocol; or the EM includes an LSN field, and each LSN field included in the EM is set to a set value.

In an example, when reconfiguring the PDCP layer is to change from LTE PDCP to NR PDCP, a format of the status report is a format of an NR PDCP status report; or, when reconfiguring the PDCP layer is to change from the NR PDCP to the LTE PDCP, a format of the status report is a format of a LTE PDCP status report.

In an example, when reconfiguring the PDCP layer is to change from the LIE PDCP to the NR PDCP, a format of the EM is a format of an LTE PDCP EM; or, when reconfiguring the PDCP layer is to change from the NR PDCP to the LTE PDCP, a format of the EM is a format of an NR PDCP EM.

It can be seen that, in this solution, when reconfiguring the PDCP layer, it is not necessary to reset all bearers (for example, it is not required to reconfigure the RLC layer and the MAC layer, and existing transmissions in the RLC layer and the MAC layer remain), and only the PDCP layer needs to be reconfigured, preventing other bearers from being affected due to a change in the PDCP layer, thereby ensuring data continuity of other services.

Figure 11:
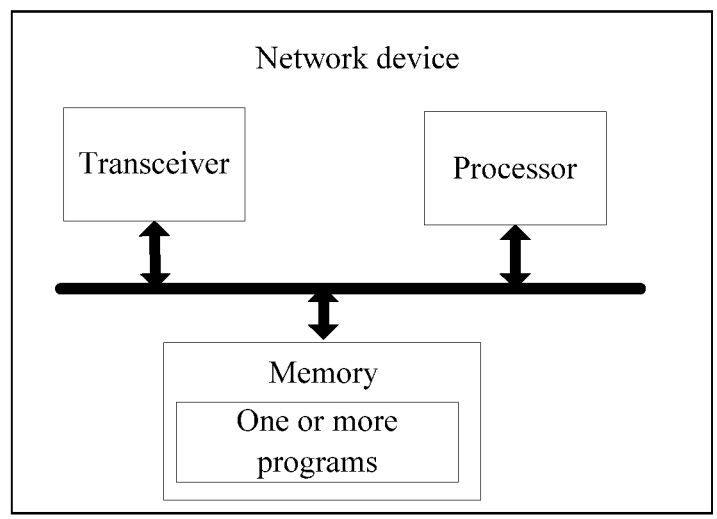
FIG. 11 is a schematic structural diagram of another network device according to an embodiment of the present disclosure.

Referring to FIG. 11, FIG. 11 is a network device according to an embodiment of the present disclosure, which includes: one or more processors, one or more memories, one or more transceivers, and one or more programs;

the one or more programs are stored in the memories and configured to be executed by the one or more processors;

the programs include an instruction for performing the following steps:

transmitting a reconfiguration instruction, where the reconfiguration instruction is used to instruct a user equipment to reconfigure a PDCP layer;

transmitting an EM to the user equipment.

In an example, the programs include an instruction for performing the following steps:

receiving a status report from the user equipment;

transmitting a PDU to the user equipment according to the status report.

In an example, the reconfiguration instruction includes a key and/or integrity check information parameters, and the programs include an instruction for performing the following steps:

decrypting the received PDU according to the key; and/or, performing by the user equipment integrity check processing on the received PDU according to the integrity check information parameters;

transmitting the processed PDU to the user equipment.

In an example, the EM does not include an LSN field, and a PDU type included in the EM is different from a PDU type included in an EM defined in the LTE protocol; or the EM includes an LSN field, and each LSN field included in the EM is set to a set value.

In an example, when reconfiguring the PDCP layer is to change from LTE PDCP to NR PDCP, a format of the status report is a format of an NR PDCP status report; or, when reconfiguring the PDCP layer is to change from the NR PDCP to the LTE PDCP, a format of the status report is a format of a LTE PDCP status report.

In an example, when reconfiguring the PDCP layer is to change from the LTE PDCP to the NR PDCP, a format of the EM is a format of an LTE PDCP EM; or, when reconfiguring the PDCP layer is to change from the NR PDCP to the LTE PDCP, a format of the EM is a format of an NR PDCP EM.

It can be seen that, in this solution, when reconfiguring the PDCP layer, it is not necessary to reset all bearers (for example, it is not required to reconfigure the RLC layer and the MAC layer, and existing transmissions in the RLC layer and the MAC layer remain), and only the PDCP layer needs to be reconfigured, preventing other bearers from being affected due to a change in the PDCP layer, thereby ensuring data continuity of other services.

Figure 12:
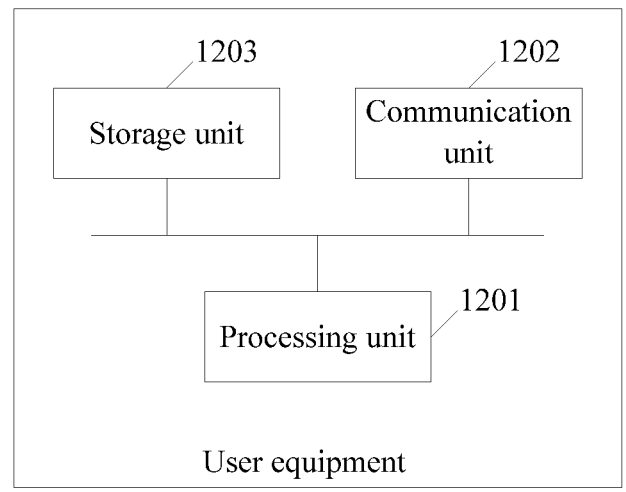
FIG. 12 is a schematic structural diagram of another user equipment according to an embodiment of the present disclosure.

Referring to FIG. 12, FIG. 12 is a schematic structural diagram of a user equipment according to an embodiment of the present application. The user equipment includes a processing unit 1201, a communication unit 1202, and a storage unit 1203.

Where the processing unit 1201 is configured to receive a reconfiguration instruction from a network device via the communication unit 1202, where the reconfiguration instruction is used to instruct reconfiguration of a PDCP layer; reconfigure the PDCP layer, and transmit an EM via the communication unit 1202.

Where the processing unit 1201 may be a processor or a controller, for example, a Central Processing Unit (CPU), a general-purpose processor, a Digital Signal Processor (DSP), an Application-Specific Integrated Circuit (ASIC), Field Programmable Gate Array (FPGA) or other programmable logic device, a transistor logic device, a hardware component, or any combination thereof, which may implement or execute various exemplary logical blocks, modules and circuits described with reference to the present disclosure. The processor may also be a combination for achieving computing functions, for example, the processor includes a combination of one or more microprocessors, a combination of a DSP and a microprocessor, and the like. The communication unit 1202 may be a transceiver, a transceiver circuit, a radio frequency chip, a communication interface, etc., and the storage unit 1203 may be a memory.

When the processing unit 1201 is a processor, the communication unit 1202 is a communication interface, and the storage unit 1203 is a memory, the user equipment involved in this embodiment of the present disclosure may be the user equipment shown in FIG. 8.

Figure 13:
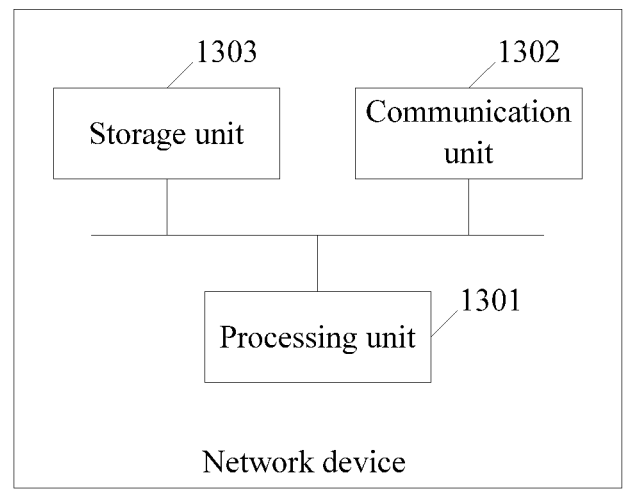
FIG. 13 is a schematic structural diagram of another network device according to an embodiment of the present disclosure.

Referring to FIG. 13, FIG. 13 is a schematic structural diagram of a network device according to the embodiment. The network device includes a processing unit 1301, a communication unit 1302, and a storage unit 1303, where the processing unit 1301 is configured to transmit a reconfiguration instruction via the communication unit 1302, where the reconfiguration instruction is used to instruct a user equipment to reconfigure a PDCP layer, and receive an EM from the user equipment via the communication unit 1302.

The processing unit 1301 may be a processor or a controller, for example, a Central Processing Unit (CPU), a general-purpose processor, a Digital Signal Processor (DSP), an Application-Specific Integrated Circuit (ASIC), Field Programmable Gate Array (FPGA) or other programmable logic device, a transistor logic device, a hardware component, or any combination thereof, which may implement or execute various exemplary logical blocks, modules and circuits described with reference to the present disclosure. The processor may also be a combination for achieving computing functions, for example, the processor includes a combination of one or more microprocessors, a combination of a DSP and a microprocessor, and the like. The communication unit 1302 may be a transceiver, a transceiver circuit, a radio frequency chip, a communication interface, etc., and the storage unit 1303 may be a memory.

When the processing unit 1301 is a processor, the communication unit 1302 is a communication interface, and the storage unit 1303 is a memory, the user equipment involved in an embodiment of the present disclosure may be the network device shown in FIG. 9.

Figure 14:
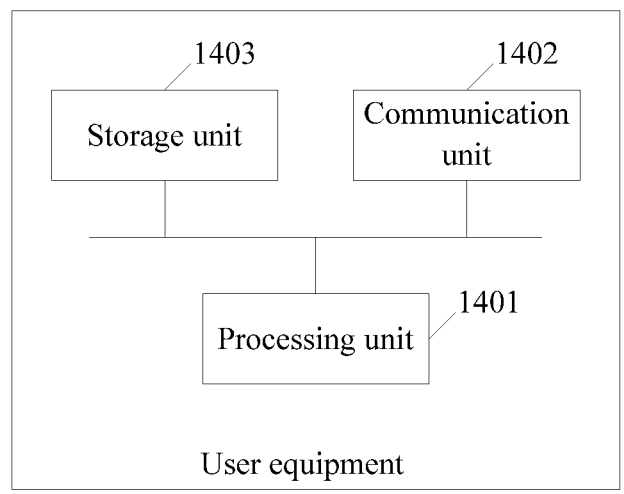
FIG. 14 is a schematic structural diagram of another user equipment according to an embodiment of the present disclosure.

Referring to FIG. 14, FIG. 14 is a schematic structural diagram of a user equipment according to the embodiment. The user equipment includes a processing unit 1401, a communication unit 1402, and a storage unit 1403.

Where the processing unit 1401 is configured to receive a reconfiguration instruction from a network device via the communication unit 1402, where the reconfiguration instruction is used to instruct reconfiguration of a PDCP layer; reconfigure the PDCP layer, and receive an EM from the network device via the communication Unit 1402.

The processing unit 1401 may be a processor or a controller, for example, a Central Processing Unit (CPU), a general-purpose processor, a Digital Signal Processor (DSP), an Application-Specific Integrated Circuit (ASIC), Field Programmable Gate Array (FPGA) or other programmable logic device, a transistor logic device, a hardware component, or any combination thereof, which may implement or execute various exemplary logical blocks, modules and circuits described with reference to the present disclosure. The processor may also be a combination for achieving computing functions, for example, the processor includes a combination of one or more microprocessors, a combination of a DSP and a microprocessor, and the like. The communication unit 1402 may be a transceiver, a transceiver circuit, a radio frequency chip, a communication interface, etc., and the storage unit 1403 may be a memory.

When the processing unit 1401 is a processor, the communication unit 1402 is a communication interface, and the storage unit 1403 is a memory, the user equipment involved in an embodiment of the present disclosure may be the user equipment shown in FIG. 10.

Figure 15:
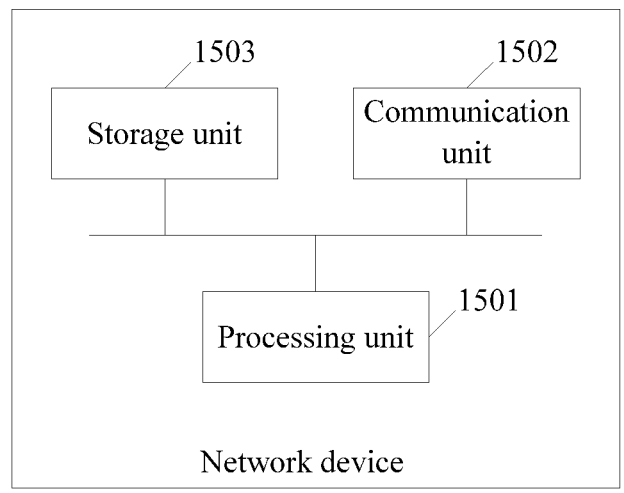
FIG. 15 is a schematic structural diagram of another network device according to an embodiment of the present disclosure.

Referring to FIG. 15, FIG. 15 is a schematic structural diagram of a network device according to the embodiment.

The network device includes a processing unit 1501, a communication unit 1502, and a storage unit 1503.

Where the processing unit 1501 is configured to transmit a reconfiguration instruction by the communication unit 1502, where the reconfiguration instruction is used to instruct a user equipment to reconfigure a PDCP layer; and transmit an EM via the communication unit 1502.

The processing unit 1501 may be a processor or a controller, for example, a Central Processing Unit (CPU), a general-purpose processor, a Digital Signal Processor (DSP), an Application-Specific Integrated Circuit (ASIC), Field Programmable Gate Array (FPGA) or other programmable logic device, a transistor logic device, a hardware component, or any combination thereof, which may implement or execute various exemplary logical blocks, modules and circuits described with reference to the present disclosure. The processor may also be a combination for achieving computing functions, for example, the processor includes a combination of one or more microprocessors, a combination of a DSP and a microprocessor, and the like. The communication unit 1502 may be a transceiver, a transceiver circuit, a radio frequency chip, a communication interface, etc., and the storage unit 1503 may be a memory.

When the processing unit 1501 is a processor, the communication unit 1502 is a communication interface, and the storage unit 1503 is a memory, the user equipment involved in an embodiment of the present disclosure may be the network device shown in FIG. 11.

Figure 16:
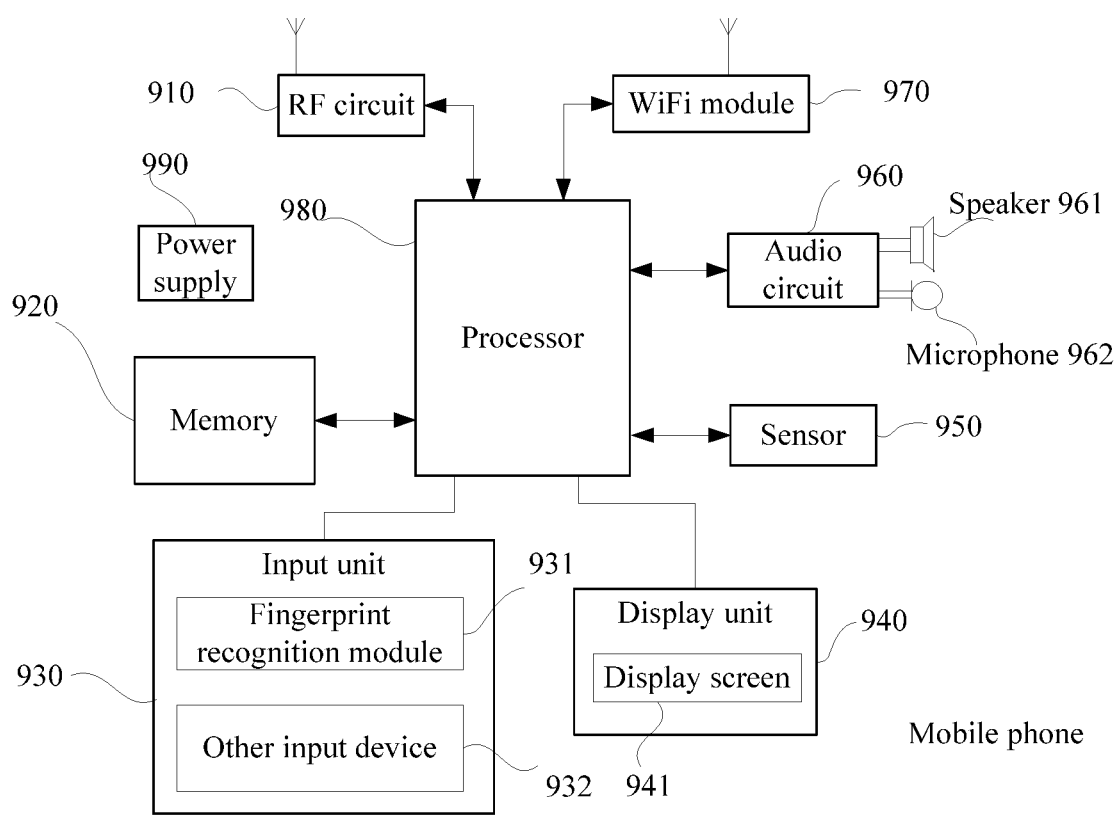
FIG. 16 is a schematic structural diagram of another user equipment according to an embodiment of the present disclosure.

An embodiment of the present disclosure further provides another user equipment. As shown in FIG. 16, for the convenience of description, only parts related to an embodiment of the present disclosure are shown, and please refer to the methods in the embodiments of the present disclosure for specific technical details that are not disclosed. The user equipment can be any user equipment including a mobile phone, a tablet computer, a Personal Digital Assistant (PDA), a Point of Sales (POS), a car computer, and the like. Taking the user equipment being a mobile phone as an example:

FIG. 16 is a block diagram showing a partial structure of a mobile phone which is related to user equipment provided by an embodiment of the present disclosure. Referring to FIG. 16, the mobile phone includes: a radio frequency (RF) circuit 910, a memory 920, an input unit 930, a display unit 940, a sensor 950, an audio circuit 960, a wireless fidelity (WiFi) module 970, and a processor 980, a power supply 990 and other components. It will be understood by those skilled in the art that the structure of the mobile phone in FIG. 16 does not constitute a limitation to the mobile phone, and the mobile phone may include more or less components than those illustrated, or some components may be combined, or different components may be arranged.

The components of the mobile phone will be described below in detail with reference to FIG. 16.

An RF circuit 910 can be used for receiving and transmitting information. Generally, the RF circuit 910 includes, but is not limited to, an antenna, at least one amplifier, a transceiver, a coupler, a Low Noise Amplifier (LNA), a duplexer. In addition, the RF circuitry 910 can also communicate with networks and other devices via wireless communication. The above wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), and the like.

A memory 920 can be used to store software programs and modules, and the processor 980 operates various functional applications and data processing of the mobile phone by running software programs and modules stored in the memory 920. The memory 920 may mainly include a program storage area and a data storage area, where the program storage area may store an operating system, application programs required for at least one function, and the like; the data storage area may store data created according to usage of the mobile phone, and the like. Moreover, the memory 920 can include high speed random access memory, and can also include non-volatile memory, such as at least one magnetic disk storage device, a flash memory device, or other volatile solid-state storage device.

An input unit 930 can be configured to receive input numeric or character information and to generate key signal inputs related to user settings and function controls of the mobile phone. Specifically, the input unit 930 can include a fingerprint recognition module 931 and other input device 932. The fingerprint recognition module 931 can collect fingerprint data of a user. In addition to the fingerprint recognition module 931, the input unit 930 may also include other input device 932. Specifically, other input device 932 may include, but not limited to, one or more of a touch screen, a physical keyboard, function keys (such as volume control buttons, switch, buttons, etc.), a trackball, a mouse, a joystick, and the like.

A display unit 940 can be used to display information inputted by the user or information provided to the user as well as various menus of the mobile phone. The display unit 940 can include a display screen 941. In an embodiment, the display screen 941 can be configured in the form of a liquid crystal display (LCD), an organic light-emitting diode (OLED), or the like. Although in FIG. 16, the fingerprint recognition module 931 and the display screen 941 are used as two separate components to implement the input and the output function of the mobile phone, in some embodiments, the fingerprint recognition module 931 and the display screen 941 may be integrated to achieve the input and play functions of the mobile phone.

The mobile phone may also include at least one type of sensor 950, such as a light sensor, a motion sensor, and other sensors. Specifically, the light sensor may include an ambient light sensor and a proximity sensor, where the ambient light sensor may adjust the brightness of the display screen 941 according to the brightness of the ambient light, and the proximity sensor may turn off the display screen 941 and/or backlight when the mobile phone moves to the ear. As a kind of motion sensor, an accelerometer sensor can detect the magnitude of acceleration in all directions (usually three axes). When the mobile phone is stationary, the accelerometer sensor can detect the magnitude and direction of gravity, and the accelerometer sensor can be used for applications of identifying the gesture of the mobile phone (such as horizontal and vertical screen switching, related games, magnetometer attitude calibration), and vibration recognition related functions (such as pedometer and tapping), etc. And other sensors such as gyroscopes, barometers, hygrometers, thermometers, infrared sensors, etc. that can also be configured in mobile phones are not described here.

An audio circuit 960, a speaker 961, and a microphone 962 can provide an audio interface between a user and the mobile phone. The audio circuit 960 can transmit an electrical signal converted from a received audio data to the speaker 961 which converts the electrical signal into a sound signal for playing; in another aspect, the microphone 962 converts a collected sound signal into an electrical signal which is received by the audio circuit 960 and then converted into audio data, and then the audio data is processed by the processor 980, and transmitted to, for example, another mobile phone via the RF circuit 910, or the audio data is stored to the memory 920 for further processing.

WiFi is a short-range wireless transmission technology, and the mobile phone can help users to transmit and receive emails, browse web pages, and access to streaming media through a WiFi module 970, which provides users with wireless broadband internet access. Although FIG. 16 shows the WiFi module 970, it can be understood that the WiFi module 970 is not necessary to the mobile phone, and can be omitted as needed within the scope of not changing the essence of the disclosure.

The processor 980 is a control center of the mobile phone, which connects various portions of the entire mobile phone using various interfaces and lines, executes various functions of a mobile phone and processes data by running or executing software programs and/or modules stored in the memory 920 and invoking data stored in the memory 920, so as to perform overall monitoring of the mobile phone. In an embodiment, the processor 980 may include one or more processing units; preferably, the processor 980 may integrate an application processor and a modem processor, where the application processor mainly processes an operating system, a user interface, an application, and the like, and the modem processor primarily handles wireless communications. It will be appreciated that the above described modem processor may also not be integrated into the processor 980.

The mobile phone also includes a power source 990 (such as a battery) that supplies power to various components. Preferably, the power source can be logically coupled to the processor 980 through a power management system to manage functions such as charging, discharging, and power management through the power management system.

Although not shown, the mobile phone may further include a camera, a Bluetooth module, and the like, and details are not described here.

In the foregoing embodiments shown in FIG. 3 and FIG. 7, the procedure of a user equipment side in each step and method may be implemented based on the structure of the mobile phone.

In the foregoing embodiments shown in FIG. 12 and FIG. 14, functions of each unit can be implemented based on the structure of the mobile phone.

An embodiment of the present disclosure further provides a computer readable storage medium which stores a computer program for electronic data exchange, where the computer program causes the computer to perform some or all steps as described related to a user equipment in the methods according to embodiments above.

An embodiment of the present disclosure further provides a computer readable storage medium which stores a computer program for electronic data exchange, where the computer program causes the computer to perform some or all steps as described related to a network device in the methods according to embodiments above.

An embodiment of the present disclosure further provides a computer program product which includes a non-transitory computer readable storage medium storing a computer program, where the computer program may be executed to cause a computer to perform some or all steps as described related to a user equipment in the above methods, and the computer program product can be a software installation package.

An embodiment of the present disclosure further provides a computer program product which includes a non-transitory computer readable storage medium storing a computer program, where the computer program may be executed to cause a computer to perform some or all steps as described related to a network device in the above methods, and the computer program product can be a software installation package.

The steps of the method or algorithm described in the embodiments of the present disclosure may be implemented in a hardware manner, or may be implemented by a processor executing software instruction. The software instruction may be composed of corresponding software modules, which may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disk read only memory (CD-ROM) or any other form of storage medium known in the art. An exemplary storage medium is coupled to the processor to enable the processor to read information from, and write information to, the storage medium. Of course, the storage medium can also be a part of the processor. The processor and the storage medium can be located in an ASIC. Additionally, the ASIC can be located in an access network device, a target network device, or a core network device. Of course, the processor and the storage medium may also exist as discrete components in an access network device, a target network device, or a core network device.

Those skilled in the art should appreciate that in one or more of the above examples, the functions described in the embodiments of the present disclosure may be implemented entirely or partially by a software, a hardware, a firmware, or any combination thereof. When the functions described in the embodiments of the present disclosure are implemented in software, they may be implemented entirely or partially in the form of a computer program product. The computer program product includes one or more computer instructions. When the computer program instructions are loaded and executed on a computer, the processes or functions described in accordance with embodiments of the present disclosure are generated entirely or partially. The computer can be a general-purpose computer, a special-purpose computer, a computer network, or other programmable device. The computer instruction can be stored in a computer readable storage medium or transferred from one computer readable storage medium to another computer readable storage medium, for example, the computer instruction can be transmitted from a website site, a computer, a server or a data center to another website site, computer, server, or data center by wire (e.g., coaxial cable, fiber optic, Digital Subscriber Line (DSL)) or wireless (e.g., infrared, wireless, microwave, etc.) transmission. The computer readable storage medium can be any available media that can be accessed by a computer, or a data storage device such as a server, data center, or the like that is integrated by and includes one or more available media. The usable medium may be a magnetic medium (for example, a floppy disk, a hard disk, a magnetic tape), an optical medium (for example, a digital video disc (DVD)), or a semiconductor medium (for example, a solid state disk (SSD)), etc.

The purposes, technical solutions, and beneficial effects of embodiments of the present disclosure are described in detail with reference to the specific embodiments of the present disclosure. It should be understood that above is only the specific implementation of the embodiments of the present disclosure, and is not to limit the protection scope of the embodiments of the present disclosure. Ally modifica-

What is claimed is:

1. A reconfiguration method, comprising:
receiving, by a user equipment, a reconfiguration instruction from a network device, wherein the reconfiguration instruction is used to instruct reconfiguration of a packet data convergence protocol (PDCP) layer; and
reconfiguring the PDCP layer and transmitting an end-marker (EM), by the user equipment;
when the EM is defined only in a new radio (NR) PDCP protocol and reconfiguration of the PDCP layer of the user equipment is to switch from a long term evolution (LTE) PDCP to an NR PDCP, before the user equipment transmits the EM, the method further comprising: performing, by the user equipment, resetting processing, wherein the resetting processing comprises at least one of: resetting a robust header compression (ROHC), resetting a protocol data unit (PDU) sequence number (SN), and resetting a hyper frame number (HFN); and
when the EM is defined only in an NR PDCP protocol and reconfiguration of the PDCP layer of the user equipment is to switch from an NR PDCP to an LTE PDCP, or when the EM is defined in both the NR PDCP protocol and an LTE PDCP protocol, after the user equipment transmits the EM, the method further comprises: performing, by the user equipment, resetting processing, wherein the resetting processing comprises at least one of: resetting a ROHC, resetting a PDU SN, and resetting a HFN.

2. The method according to claim 1, wherein the EM does not comprise a log sequence number (LSN) field, and a protocol data unit (PDU) type comprised in the EM is different from a PDU type comprised in an EM defined in a long term evolution (LTE) protocol; or the EM comprises an LSN field, and each LSN field comprised in the EM is set to a set value.

3. The method according to claim 1, wherein after the user equipment performs the resetting processing, the method further comprises:
receiving, by the user equipment, a status report from the network device;
transmitting, by the user equipment, a PDU according to the status report.

4. The method according to claim 1, wherein the reconfiguration instruction comprises a key and/or an integrity check information parameter, and the method further comprises:
performing, by the user equipment, encryption processing on a PDU to be transmitted according to the key; and/or, performing, by the user equipment, integrity check processing on the PDU to be transmitted according to the integrity check information parameter;
transmitting, by the user equipment, the processed PDU.

5. The method according to claim 1, wherein the method further comprises:
transmitting, by the user equipment, an LTE PDCP PDU from the PDCP layer of the user equipment to a RLC layer of a LTE-side of the user equipment.

6. The method according to claim 1, wherein the transmitting an EM by the user equipment comprises:
transmitting, by the user equipment, an EM from the PDCP layer of the user equipment to a RLC layer of a LTE-side of the user equipment.

7. A user equipment, comprising a processor, a transceiver and a memory, wherein:
the transceiver is configured to receive a reconfiguration instruction from a network device, wherein the reconfiguration instruction is used to instruct reconfiguration of a packet data convergence protocol (PDCP) layer;
the memory has executable instructions stored thereon that when executed by the processor cause the processor to: reconfigure the PDCP layer; and
the transceiver is further configured to transmit an end-marker (EM);
when the EM is defined only in a new radio (NR) PDCP protocol and reconfiguration of the PDCP layer of the user equipment is to switch from a long term evolution (LTE) PDCP to an NR PDCP, before transmitting the EM, the memory further has executable instructions stored thereon that when executed by the processor cause the processor to: perform resetting processing, wherein the resetting processing comprises at least one of: resetting a robust header compression (ROHC), resetting a protocol data unit (PDU) sequence number (SN), and resetting a hyper frame number (HFN); and
when the EM is defined only in an NR PDCP protocol and reconfiguration of the PDCP layer of the user equipment is to switch from an NR PDCP to an LTE PDCP, or when the EM is defined in both the NR PDCP protocol and an LTE PDCP protocol, after transmitting the EM, the memory further has executable instructions stored thereon that when executed by the processor cause the processor to: perform resetting processing, wherein the resetting processing comprises at least one of: resetting a ROHC, resetting a PDU SN, and resetting a HFN.

8. The user equipment according to claim 7, wherein after performing the resetting processing, the transceiver is further configured to:
receive a status report from the network device; and
transmit a PDU according to the status report.

9. The user equipment according to claim 8, wherein when the reconfiguring the PDCP layer is to change from the LTE PDCP to the NR PDCP, a format of the status report is a format of an NR PDCP status report; or, when the reconfiguring the PDCP layer is to change from the NR PDCP to the LTE PDCP, a format of the status report is a format of a LTE PDCP status report.

10. The user equipment according to claim 7, wherein the reconfiguration instruction comprises at least one of a key and an integrity check information parameter, and the memory further has executable instructions stored thereon that when executed by the processor cause the processor to:
perform at least one of: encryption processing on a PDU to be transmitted according to the key; and, integrity check processing on the PDU to be transmitted according to the integrity check information parameter; and
the transceiver is further configured to transmit the processed PDU.

11. The user equipment according to claim 7, wherein the transceiver is further configured to:
transmit an LTE PDCP PDU from the PDCP layer of the user equipment to a RLC layer of a LTE-side of the user equipment.

12. The user equipment according to claim 7, wherein the transceiver is further configured to:
transmit the EM from the PDCP layer of the user equipment to a RLC layer of a LTE-side of the user equipment.

13. The user equipment according to claim 7, wherein the EM does not comprise a log sequence number (LSN) field, and a PDU type comprised in the EM is different from a PDU type comprised in an EM defined in a LTE protocol; or the EM comprises an LSN field, and each LSN field comprised in the EM is set to a set value.

14. The user equipment according to claim 7, wherein when the reconfiguring the PDCP layer is to change from the LTE PDCP to the NR PDCP, a format of the EM is a format of an LTE PDCP EM; or, when the reconfiguring the PDCP layer is to change from the NR PDCP to the LTE PDCP, a format of the EM is a format of an NR PDCP EM.

15. A user equipment, comprising a processor, a transceiver and a memory, wherein:
the transceiver is configured to receive a reconfiguration instruction from a network device, wherein the reconfiguration instruction is used to instruct reconfiguration of a packet data convergence protocol (PDCP) layer;
the memory has executable instructions stored thereon that when executed by the processor cause the processor to: reconfigure the PDCP layer; and
the transceiver is further configured to receive an end-marker (EM) from the network device;
when the EM is defined only in a new radio (NR) PDCP protocol and reconfiguration of the PDCP layer of the user equipment is to switch from a long term evolution (LTE) PDCP to an NR PDCP, before receiving the EM from the network device, the memory further has executable instructions stored thereon that when executed by the processor cause the processor to: perform resetting processing, wherein the resetting processing comprises at least one of: resetting a robust header compression (ROHC), resetting a protocol data unit (PDU) sequence number (SN), and resetting a hyper frame number (HFN); and
when the EM is defined only in an NR PDCP protocol and reconfiguration of the PDCP layer of the user equipment is to switch from an NR PDCP to an LTE PDCP, or when the EM is defined in both the NR PDCP protocol and an LTE PDCP protocol, after receiving the EM from the network device, the memory further has executable instructions stored thereon that when executed by the processor cause the processor to: perform resetting processing, wherein the resetting processing comprises at least one of: resetting a ROHC, resetting a PDU SN, and resetting a HFN.

16. The user equipment according to claim 15, wherein after performing the resetting processing, the transceiver is further configured to:
transmit a status report to the network device, wherein the status report is used by the network device to determine a PDU to be transmitted to the user equipment.

17. The user equipment according to claim 16, wherein when the reconfiguring the PDCP layer is to change from the LTE PDCP to the NR PDCP, a format of the status report is a format of an NR PDCP status report; or, when the reconfiguring the PDCP layer is to change from the NR PDCP to the LTE PDCP, a format of the status report is a format of a LTE PDCP status report.

18. The user equipment according to claim 15, wherein the reconfiguration instruction comprises at least one of a key and an integrity check information parameter, and the transceiver is further configured to:
receive a PDU from the network device; and
the memory further has executable instructions stored thereon that when executed by the processor cause the processor to: perform at least one of decryption processing on a received PDU according to the key; and, integrity check processing on the received PDU according to the integrity check information parameter.

19. The user equipment according to claim 15, wherein the EM does not comprise a log sequence number (LSN) field, and a PDU type comprised in the EM is different from a PDU type comprised in an EM defined in the LTE protocol; or the EM comprises an LSN field, and each LSN field comprised in the EM is set to a set value.

20. The user equipment according to claim 15, wherein when the reconfiguring the PDCP layer is to change from the LTE PDCP to the NR PDCP, a format of the EM is a format of an LTE PDCP EM; or, when the reconfiguring the PDCP layer is to change from the NR PDCP to the LTE PDCP, a format of the EM is a format of an NR PDCP EM.

\* \* \* \* \*